(No Model.)　　　　　　　　　　　　　　　　4 Sheets—Sheet 1.
D. MUELLER.
POWER BOTTLE CORKING MACHINE.
No. 482,454.　　　　　　　　Patented Sept. 13, 1892.
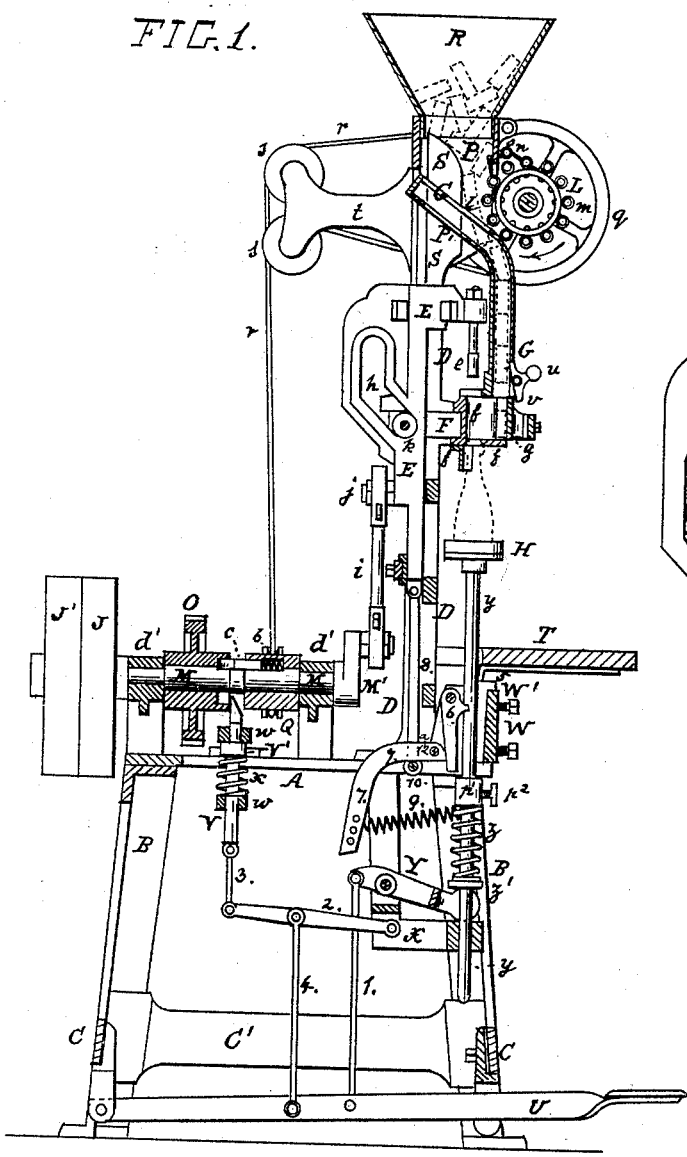
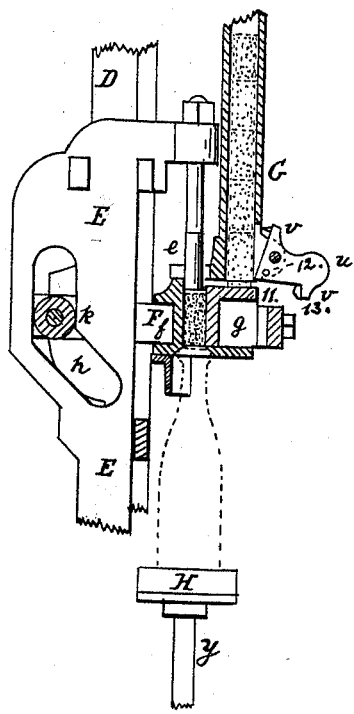
WITNESSES:　　　　　　　　　　　　　　　　　INVENTOR (No Model.) 4 Sheets—Sheet 2.
D. MUELLER.
POWER BOTTLE CORKING MACHINE.

No. 482,454. Patented Sept. 13, 1892.

Witnesses
Reinhold Boehler
J. E. Muhling

David Mueller Inventor (No Model.) 4 Sheets—Sheet 3.
D. MUELLER.
POWER BOTTLE CORKING MACHINE.
No. 482,454. Patented Sept. 13, 1892.
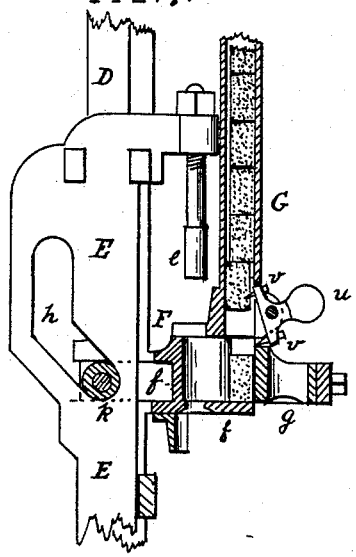
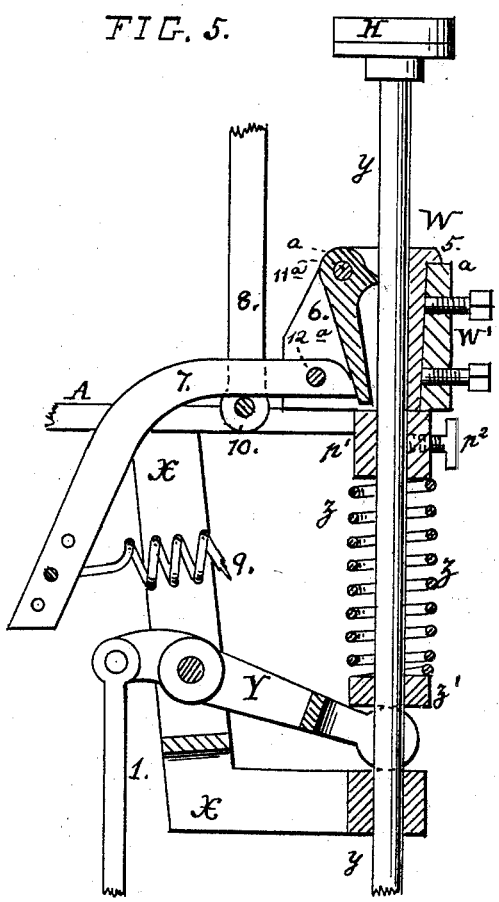
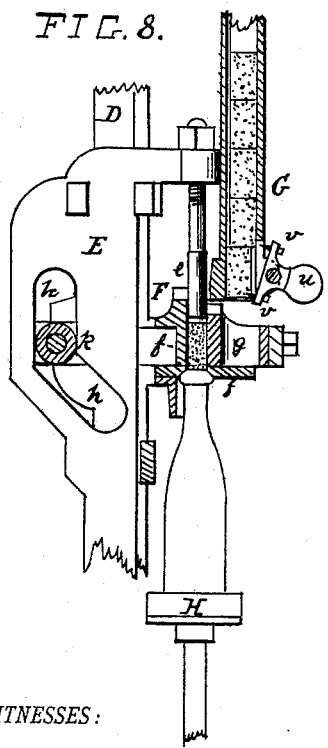
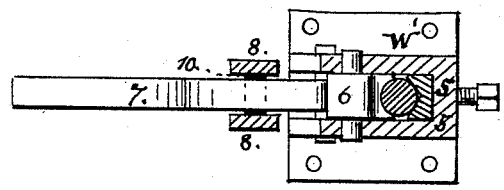
WITNESSES:
Reinhold Boeklen
J. E. Muhling
INVENTOR
David Mueller (No Model.) 4 Sheets—Sheet 4.
D. MUELLER.
POWER BOTTLE CORKING MACHINE.
No. 482,454. Patented Sept. 13, 1892.
FIG. 11.
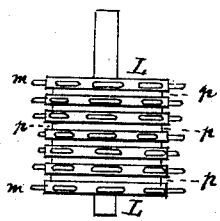
FIG. 12.
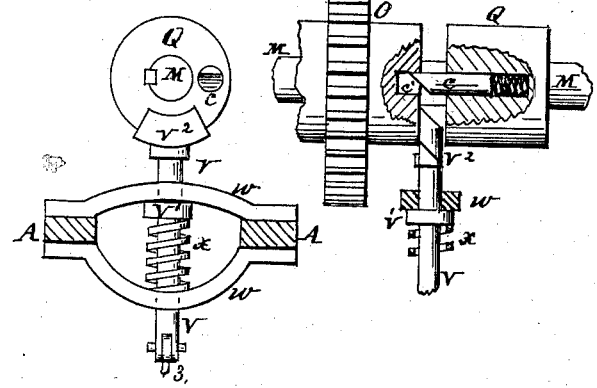
FIG. 13.
FIG. 14.
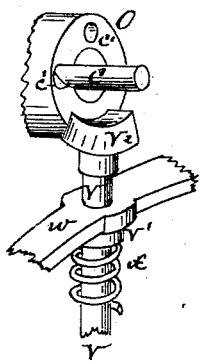
FIG. 15.
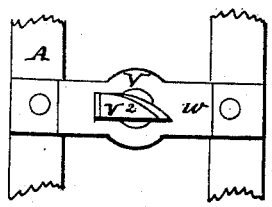
WITNESSES:
INVENTOR:
David Mueller

UNITED STATES PATENT OFFICE.

DAVID MUELLER, OF NEW YORK, N. Y., ASSIGNOR TO THE BOTTLERS' AND BREWERS' MACHINE MANUFACTURING COMPANY.

POWER BOTTLE-CORKING MACHINE.

SPECIFICATION forming part of Letters Patent No. 482,454, dated September 13, 1892.

Application filed February 2, 1892. Serial No. 420,030. (No model.)

*To all whom it may concern:*

Be it known that I, DAVID MUELLER, a citizen of the United States, and a resident of New York, in the county of New York and State of New York, have invented certain new and useful Improvements in Power Bottle-Corking Machines, of which the following is a specification.

My invention relates to improvements in power bottle-corking machines in which a vertically-reciprocating cork-plunger operates in conjunction with a horizontal opening and closing and compressing cork-guide and in conjunction with a simultaneous adjusting, securing, and relieving bottle-rest and with an automatic cork-feed. Heretofore the automatic cork-feeding in this class of machines has been irregular and unreliable, and by reason that bottles of a kind do not have strictly the same height the machine often fails to properly relieve the bottle-rest in conjunction with the action of the cork-guide and plunger therefor.

The objects of my improvements are, first, to provide the cork-feed box with a combined upwardly-agitating mechanism and the feed tube with a cut-off pawl to produce a most reliable simultaneous feed of the cork for each stroke of the cork-plunger; second, to provide the bottle-rest with a yielding lifting-lever mechanism in conjunction with an instantaneous powerful lever clamping and relieving mechanism connected with the cork-plunger for simultaneous action of the same.

Figure 3:
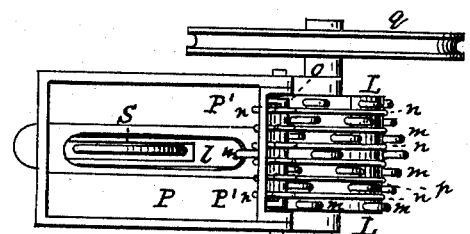
Figure 4:
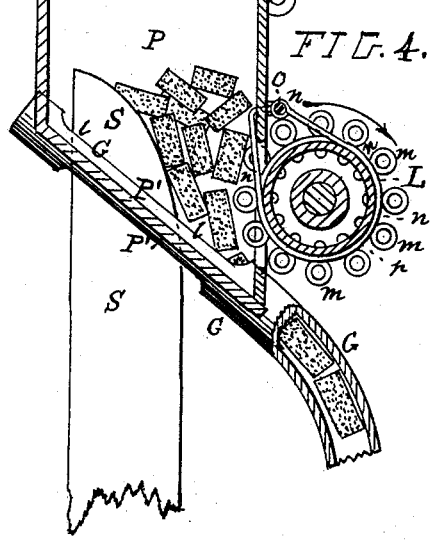
Figure 10:
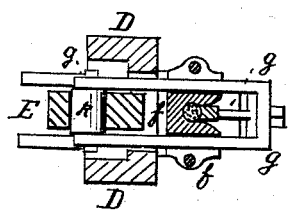
Figure 2:
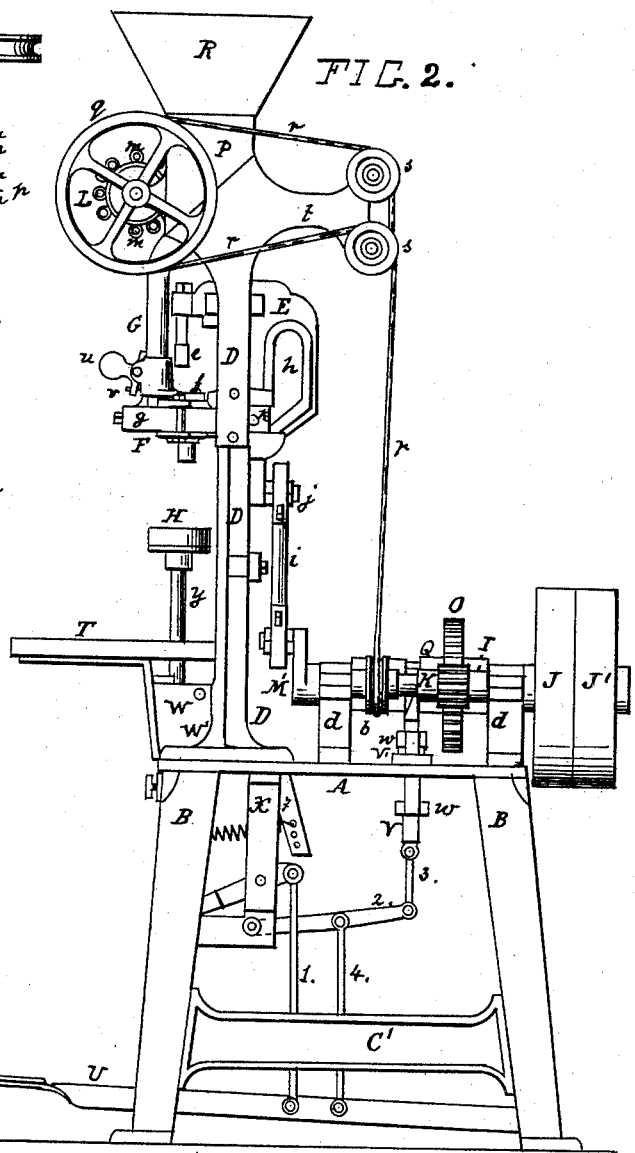

In the annexed drawings, Figure 1 represents a vertical longitudinal central section of the machine with my improvements. Fig. 2 is a side elevation of the same. Fig. 3 is a detached top view of the cork-feed box, shown with the hopper removed and on a larger scale than the former figures. Fig. 4 is a vertical section of the same. Fig. 5 is a detached vertical section of the bottle-rest-operating mechanism on a similar scale. Fig. 6 is a horizontal section of the same, taken at the line $a\,a$. Fig. 7 is a detached central vertical section of the cork-guide plunger and feed-tube, shown in position when the guide is opened to receive a cork. Fig. 8 is a similar view of the same when the guide is closed, compressing the cork, and the plunger started to force the cork in the bottle's neck. Fig. 9 is a similar view of a modification of the same. Fig. 10 is a detached horizontal section of the cork-guide. Fig. 11 represents a detached top view of the drum L on the feed-box of the machine hereinafter described. Fig. 12 is a detached cross-section of the frame with the vertical disengaging-bolt V and its guides through the crank-shaft between the clutch-collar Q and gear-wheel O of the machine, as hereinafter shown. Fig. 13 is a detached sectional side view of said collar and gear-wheel and bolt in a position just before disengagement of said clutch from said wheel. Fig. 14 is a detached perspective view of the wedge-shaped head of the bolt V, the taper-point key $c$, and the face of the hub of said wheel O, having cavities, with which said key $c$ engages, as hereinafter described. Fig. 15 is a top view of the head of the bolt V.

The letter of reference A indicates the horizontal bed-plate of the machine. It is secured upon four legs B, of which the front and rear pair have their lower ends connected by a cross-bar C, cast thereon, and the front and rear legs are connected by bolted cross-bars C' C'.

D represents the vertical guide-frame, in which the cork-plunger bar E is guided.

F is the horizontal cork-guide, to the top of which the cork-feed tube G is attached. Below the cork-guide is arranged in line the bottle-rest H.

In suitable bearings $d\,d$ upon the bed-plate A are arranged the two parallel horizontal shafts I and M, of which I represents the driving-shaft of the machine, and it is furnished with the fast and the loose belt-pulleys J J' and with a pinion-gear K and the grooved belt-pulley $b$ for rotating the agitating-drum L in the cork-feed box, and M is the crank-shaft, which is guided in the bearings $d'\,d'$ and is rotated by means of the gear-wheel O, engaged by the pinion-gear K. The crank M' of the shaft M is connected by the rod $i$ over a stud $j$, secured on the plunger-bar E, by which means said plunger-bar, with its cork-plunger $e$, is reciprocated in the guide-frame D. Upon the said shaft M is fitted the clutch-collar Q, which has a spring-key $c$ to engage with proper opposite cavities $c'$ in the hub of the gear-wheel O when required.

The cork-guide F consists of the stationary section $f$ and the horizontal sliding and contracting section $g$, which is operated by means of the curved slot $h$ in the plunger-bar E, in which the friction-roller $k$ of the sliding section $g$ engages, so that by the down motion of the bar E the section $g$ is caused to contract and carry the cork received in it from the feed-tube G into the fixed section, thereby compressing the cork ready for the plunger $e$ to force down into the neck of the bottle, all clearly shown in Figs. 1, 7, 8, and 10.

R represents the hopper, secured upon the top of the cork-feed box P, for receiving the corks in bulk. The bottom of the cork-feed box has a forwardly-inclined bottom P', and the sides are vertical, of which the front side is pivoted at the top end to the joining sides. The upper part of the feed-tube G is inserted centrally in the bottom P' and has the same inclined position. Said tube, after leaving said bottom is curved downward and terminates with its lower part vertical, and its bottom end has a foot secured upon the stationary section $f$ of the cork-guide. The inclined portion of said tube in the bottom P' has a large opening $l$ in its top, into which the corks, after being turned in proper position, drop and from there slide down in the feed-tube.

For the purpose of agitating the corks in the feed-box in a constant upward direction I employ a vertical central pointed blade S, secured in the top of the cork-plunger bar E, and pass it through a central longitudinal slot in the bottom of the tube G to cause agitation with its pointed end, lifting and turning the corks to a longitudinal direction, and employ, also, a lateral drum L on the front side in suitable bearings on the box P. Said drum has secured a number of equally-distributed rows of laterally-projecting wire eyes $m$ around its periphery, and the rows relatively arranged with their eyes opposite the spaces between the eyes of the following row, and between said rows of eyes are employed the lateral wire bands $n$, secured over a fixed longitudinal bar $o$ above the drum on the front side of the box, and from there they pass vertically down on the inner side of the front of the box and around the periphery of the drum and terminate at the bar $o$. For the purpose of keeping said wire bands $n$ in proper lateral position I provide the periphery of the drum for each band $n$ with a groove $p$, in which the band is guided, as shown in Figs. 3, 4, and 11. The drum L has upon its shaft end projecting beyond the right-hand bearing a belt-wheel $q$, upon which is employed a round belt $r$, which passes over the guide-pulleys $s\,s$ down over the pulley $b$ upon the driving-shaft. By this means the drum L is rotated, and it revolves upward against the corks in the box, as shown by the arrows. The guide-pulleys $s\,s$ are mounted upon proper studs, which are secured to an arm $t$, cast on the box. By the combined action of the reciprocating blade S and rotating drum, with its appurtenances, a plentiful supply of corks is fed into the tube G for continuous operation of the machine. At the bottom front end of the feed-tube is pivoted a weighted pawl $u$, having a top and bottom arm $v$, each provided with a projecting spur-point. By means of the bottom arm $v$ and its spur the bottom cork is held from dropping from the feed-tube G and holding those above, as shown in Fig. 8; but the sliding section $g$ of the cork-guide in opening engages said bottom arm $v$ and causes the top arm to engage the cork above and allows the bottom cork to drop upon the stationary section $f$, as shown in Figs. 1 and 7. The sliding section $g$ thereafter closes, moving the cork under the plunger $e$ and compressing the same, as shown in Figs. 8 and 9, and the plunger forces the cork in the bottle's neck.

Instead of constructing the sliding section $g$ of the cork-guide and the pawl $u$ as described, their construction may be modified. Said section $g$ may on its top have a forward extension 11 to rest the bottom cork, and the said pawl may have a stop-pin 12 against the tube G and a downward nose 13 to engage with the extension 11, and the same result as a cut-off for the corks is obtained.

At a suitable height above the bed-plate A and below the bottle-rest H is made a table T for placing bottles to be corked near by for quickly handling the bottles at the machine.

At the bottom portion of the machine is employed from front to rear a treadle-bar U, hinged to the rear cross-bar C, and a vertically-sliding spring-bolt V is employed centrally below the shaft M to operate in the space between the gear-wheel O and the clutch-collar Q, as clearly shown in Figs. 11, 12, 13, 14, and 15. Said bolt is guided in a top and bottom cross piece $w$, secured upon the table A, and said bolt has a collar V' secured upon it, and a spring $x$ is employed over said bolt between the collar V' and the bottom cross-piece $w$. The top end or head $V^2$ of said bolt is made wedge shape and serves the purpose to stop the crank-shaft M in being allowed to rise by its spring $x$ and enter between said gear-wheel O and the spring-key $c$ and forcing back said key $c$ from engaging with the cavities in the hub of the gear-wheel O. By the spring $c^2$ the key $c$ is forced into the cavities $c'$ when opposite and allowed by the head $V^2$ of the bolt.

The bottle-rest H has a long vertical guide-rod $y$. Its portion above the bed-plate A is guided in the clamp W, which is secured upon the bed-plate A. Its bottom portion is guided in a hanger X, bolted to the bottom side of said plate A. Upon the portion of said rod below the clamp W is fitted the adjustable collar $p'$, provided with a set-screw $p^2$, and over the greater portion below said collar $p'$ is employed a spiral spring $z$, resting upon a loose collar $z'$, and between said collar over said rod and the bottom guide of the hanger X are employed the loose ends of a forked two-armed lever Y, which is pivoted to the hanger X, and its short and secondary arm is connected by means of the rod 1 to the treadle-bar U, as shown. To the hanger X is also pivoted a single-armed rearward lever 2, of which the rear end is connected to the bottom end of the spring-bolt V by means of the rod 3, and the middle portion of the lever 2 is connected with the treadle-bar U by means of the rod 4. By this means the bottle-rest H as well as the spring-bolt V are both together operated with the treadle-bar U.

The clamp W for holding the bottle-rest H against the action of the cork-plunger consists of a vertical case W' over the rod $y$, having a slotted open rear end. In the front part along the rod $y$ is employed a key 5, fitted in the vertical slot of the case and having a hollow face against the rod $y$, as shown. In the rear part of said slot is employed a short grip-lever 6, and at the rear of the lever 6 is pivoted a bent lever 7, both guided in said rear slot of the case W'. The lever 6 is attached and suspended loose to the upper portion of the case W' by the cross-pin $11^a$, and the lever 7 is pivoted to the lower part of said case by the fulcrum-pin $12^a$, as shown in Figs. 1, 5, and 6. The lever 6 when left loose is suspended from its fulcrum downward with its grip-arm loose from engagement with the rod $y$. Its grip-arm is made very near its fulcrum and is made hollow at its grip-point to engage a part around the periphery of the rod $y$. The lever 7 is also pivoted near its end engaging the arm of the lever 6, as shown, so that by the combined action of both levers a very powerful grip upon the rod $y$ is obtained. A portion from the fulcrum of the loose arm of the lever 7 is made horizontal, while the remaining end is bent downward. To this downward end is attached a spiral spring 9, assisting the lever in the gripping motion.

To the bottom end of the cork-plunger bar E is attached a pair of links 8, between which the horizontal portion of the lever 7 passes, and said links are connected by a cross-piece 10, passing under said part of the lever 7. Said pin 10 is arranged to raise the lever 7 sufficiently to relieve the lever 6 from gripping the rod $y$ while the cork-plunger is nearly at the top of its stroke; but before the said plunger in passing downward meets the cork said pin 10 allows the levers 7 and 6 to grip the rod $y$ with full force. The lever 6 does not grip the rod $y$ unless actuated to do so by the short arm of the lever 7; and the lever 7 is held up, and thereby prevented from acting on the loose arm of the lever 6, by the cross-pin 10 on the links 8, which are attached to the plunger-bar E. During the period of motion of the plunger $e$ passing up or down above the cork-guide the lever 7 is held up clear of action on the lever 6 by the pin 10; but as soon as the plunger $e$ enters the cork-guide and before coming in contact with the top of the cork to be forced into the bottle said pin 10 has dropped sufficiently low to release the lever 7, which thereupon acts upon the lever 6 to grip the rod $y$. When the plunger $e$ is raised above the cork-guide and the lever 7 held out of action, the bottle-rest H, with its rod $y$, overbalances the weight of the treadle and the spring $z$, and, being clear, of the grip from the lever 6, said bottle-rest H drops sufficiently to allow the bottle to pass freely from under the cork-guide and allow a following bottle to be put upon the rest H for action. By this means in corking bottles after the bottle is placed upon its rest H and the treadle-bar is pressed down simultaneously with it, allowing the spring-key $c$ to engage with moving gear-wheel O and imparting motion to the shaft M and the cork-plunger $e$, the bottle-rest H is raised, with the bottle closely joining the cork-guide and the clamp W gripping powerfully the rod $y$ of the bottle-rest against the action of the plunger $e$ upon the bottle, and as soon as the plunger $e$ completes its trip the clamp W releases the bottle-rest to remove and change the bottle. The collar $p'$ is adjusted with the set-screw $p^2$ to suit the kind of bottles operated upon by means of the spring $z$. A small variation in the length of the bottle does not prevent the bottle from joining the cork-guide properly, and the quick powerful action of the clamp W prevents the bottle from retreating from the cork-guide.

What I claim as my invention, and desire to secure by Letters Patent, is—

1. In a power bottle-corking machine, the combination, with the driving-shaft I and its pinion, the crank-shaft M, with its gear-wheel O, the clutch Q, its engaging-key $c$, the disengaging spring-bolt V, and the connected treadle U, the connected vertically-reciprocating cork-plunger and bar E, with its curved slot $h$, and the opening and closing cork-guide F, of the bottle-rest H, with its lifting-lever Y from the treadle U, the adjustable collar $p'$ and spring $z$, and its automatic grip-levers 6 and 7, and the releasing-link 8, and pin 10, all arranged to operate substantially as and for the purpose herein set forth.

2. In a power bottle-corking machine, the combination, with the driving-shaft I, its pinion and belt-pulley, the crank-shaft M, the reciprocating plunger $e$, the opening and closing cork-guide F, and bottle-rest H, of the cork-hopper P, the connected and revolving agitating-drum L, with its projections $m$ and guide-bands $n$, the cork-plunger bar E, with its agitating-blade S, and the feed-tube G, with its cut-off pawl $u$, all arranged to operate automatically in feeding each cork for each downstroke of the cork-plunger, substantially as and for the purpose herein described.

3. In a power bottle-corking machine, the combination, with the driving-shaft L and the hopper P, the cork-plunger $e$, and cork-guide F, with its connected sliding section, of the revolving drum L, with its projections $m$, its grooves $p$, and bands $n$, the feed-tube G, its cut-off pawl $u$, and the reciprocating plate S, substantially as and for the purpose herein stated.

4. In a power bottle-corking machine, the combination, with the cork-plunger $e$ and guide-bar E, of the bottle-rest H, its rod $y$, its guide-case W', with the grip-lever 6, the link 8, its pin 10, and the lever 7, the spring $z$, the collars $p'$ and $z'$, the lever Y, and treadle U, substantially as and for the purpose herein set forth.

Signed at New York, in the county of New York and State of New York, this 29th day of January, A. D. 1892.

DAVID MUELLER.

Witnesses:
 REINHOLD BOEKLEN,
 J. E. MUHLING.